United States Patent Office 2,957,928
Patented Oct. 25, 1960

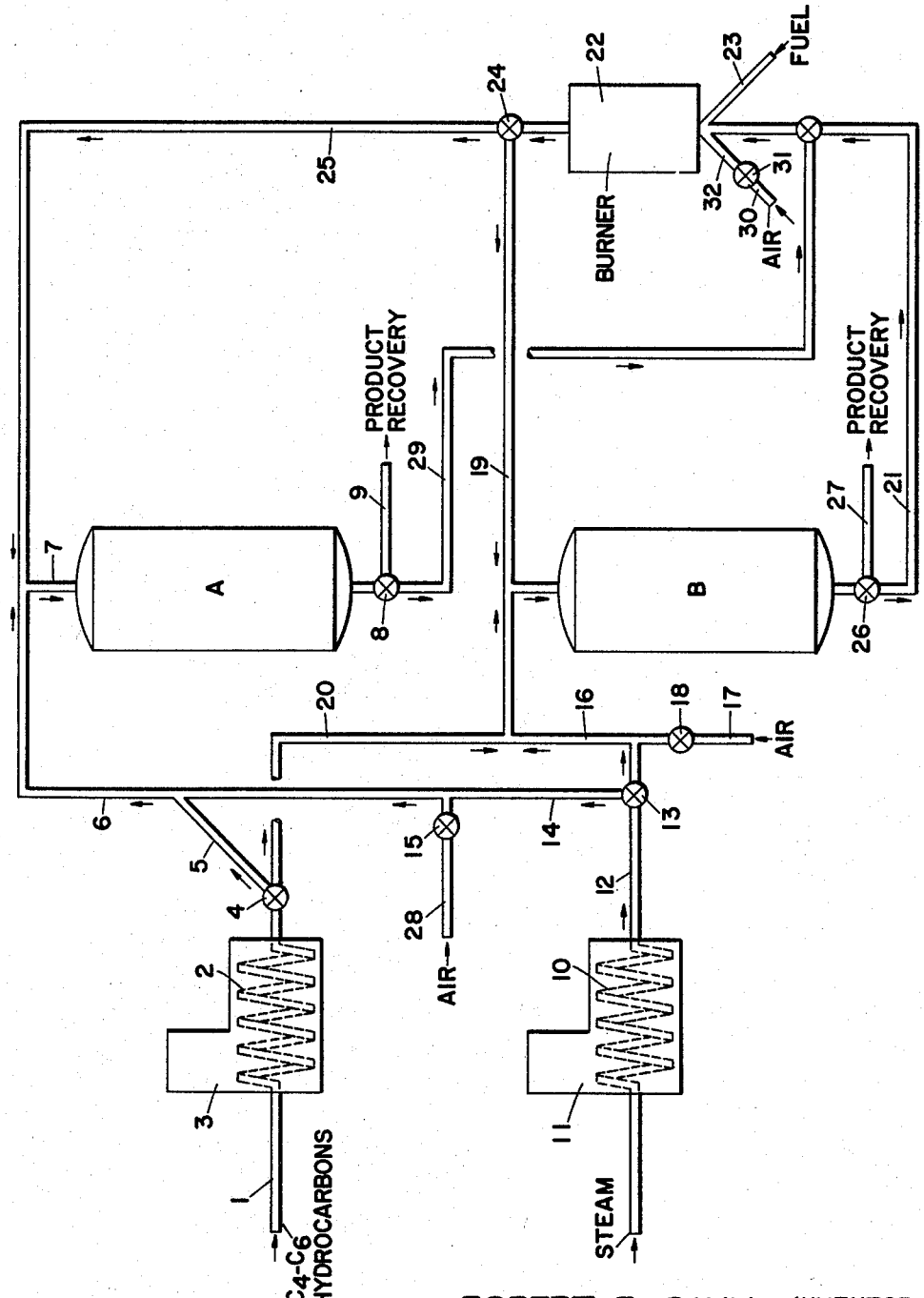

2,957,928
PRODUCTION OF DIOLEFINS

Robert P. Cahn, Elizabeth, N.J., assignor to Esso Research and Engineering Company, a corporation of Delaware Filed Sept. 25, 1958, Ser. No. 763,234
12 Claims. (Cl. 260—680)

This invention relates to a novel and improved system for the dehydrogenation of $C_4$–$C_6$ hydrocarbons more highly saturated than diolefins to diolefins. This group includes aliphatic paraffins and olefins, and cyclic paraffins and olefins but obviously does not include aromatics. More specifically, it relates to the dehydrogenation of a particular $C_4$–$C_6$ hydrocarbon from this group to its corresponding diolefin. Most specifically, this invention relates to a process whereby the quantities of steam generally required for the dehydrogenation of butenes, isopentene, isopentanes, 2,3-dimethyl butane, or 2,3-dimethyl butenes to the corresponding diolefins are reduced and concomitantly a greater degree of efficiency in the regeneration of the dehydrogenation catalyst employed is permitted. This application is a continuation-in-part of Serial No. 615,554, filed October 12, 1956, and now abandoned.

Processes for the dehydrogenation of butene to butadienes, isopentenes and isopentanes to isoprene, and 2,3-dimethyl butenes to 2,3-dimethyl butadiene have been known for many years. The importance of the manufacture of these diolefins has in the past few years been increased by the mounting demand for rubber and rubber substitutes and other copolymer products obtained from these diolefins. For example, butadiene is used in synthetic rubber, isoprene is used in synthetic natural rubber and 2,3-dimethyl butadiene has been used as a substitute for isoprene. One of the best known processes for the preparation of these diolefins involves the dehydrogenation of $C_4$–$C_6$ olefins or paraffins in the presence of certain catalysts which will be defined hereinafter and in the presence of large proportions of steam wherein regeneration of the catalyst is carried out in the presence of steam and air. A typical catalyst of the type amenable to this reaction is calcium nickel phosphate. This particular catalyst requires steam and excess air for the regeneration thereof. Other catalysts which may be used for this dehydrogenation to diolefins include magnesia-iron oxide, magnesia-chromia, and zinc oxide-iron oxide. These catalysts are well known in the art and may be employed with or without a potassium promoter. An essential quality of the catalyst employed in this process is that activity thereof should not become inhibited by large proportions of steam and high temperatures which are necessary for obtaining the high selectivity to diolefins in the primary reaction.

Basically, the process per se comprises passing a combined stream of superheated $C_4$–$C_6$ olefins and/or paraffins or a single component such as butenes and large quantities of steam into a reactor containing a solid catalyst bed of the desired type and maintaining the temperatures in said reactor at about 1000° to 1350° F. The product effluent from the reactor must of course be further processed by such means as quenching or cooling, stripping, absorption, carbonyl removal and other purification steps. Additionally, if a combined stream is dehydrogenated complicated separation steps to obtain desired pure products will usually be conducted. It is therefore preferred to dehydrogenate only a single component stream. This invention concerns only the interrelation of the reaction and regeneration steps per se so that these subsequent steps involving the purification or separation of the products obtained will not be discussed. In general, the commercial system for this type of reaction will comprise a pair of reactors, one being employed as the primary reactor and the other as the regenerator and both being capable of being switched from a reaction to regeneration operation and vice versa at intervals determined by the catalyst life between regenerations. Typical catalyst life between regenerations for the dehydrogenation of $C_4$–$C_6$ olefins or paraffins to diolefins is from 10 to 60 minutes. Such means for switching the reactors may be automatic or manual as desired. However, it is preferable to have an arrangement whereby continual production of diolefins is uninterrupted by the switching operation.

In a preferred embodiment of this invention a vaporized single component $C_4$–$C_6$ hydrocarbon feed is admixed with superheated steam and contacted with a fixed bed of catalyst at elevated temperatures, the superheated steam boosting the temperatures of the mixture to the desired reaction temperature level. During the regeneration period the vaporized hydrocarbon feed to the catalyst bed is stopped and the catalyst bed purged of all volatile hydrocarbons. After the purging, an oxygen-containing regeneration gas, preferably air or $O_2$ is admitted in excess with superheated steam for timely and adequate combustion of the carbonaceous deposits found on the catalyst, and returning the catalyst to its proper oxidation state. Finally, the regenerated catalyst is purged of combustion products and brought back to reaction conditions.

In the past it has been found impossible to recycle the used steam from the regenerating reactor to the primary reactor. Since the regeneration of the catalysts employed herein requires the use of excess amounts of air or $O_2$ as well as steam, effluent excess air or $O_2$ which is carried through the regenerating reactor with the steam would adversely affect the dehydrogenation reaction occurring in the primary reactor, consume hydrocarbon feed stock and lead to the formation of undesirable reaction products. It has been found however that the effluent steam from the regeneration tower may first be treated with a fuel whereby all or substantially all of the oxygen is consumed, leaving only combustion products and other gases such as carbon dioxide, carbon monoxide, water, hydrogen, nitrogen, excess fuel and the like which are inert in the primary reaction and serve in the primary reactor as an additional diluent to the steam. In the unusual situation where a cheap $O_2$ stream is available, it is preferred to use this stream rather than air since the large proportion of $N_2$ present in air increases the difficulty of separation of the desired diolefin product from other products from the dehydrogenation process. Burning the fuel also generates heat thus reducing the heat input requirements in the furnace or furnaces preheating the hydrocarbon feed to the reactor. If too high a temperature would be reached as a result of burning the fuel, the reaction may of course be quenched with lower temperature steam to reduce the temperature to the desired level. This will also reduce the above mentioned furnace duty.

For a clearer understanding of the invention reference is now had to the accompanying drawing which shows diagrammatically a flow plan of the double reactor unit and its regeneration facilities. For the sake of convenience the diagram will first be explained with the premise that "A" is the reactor on reaction and "B" the reactor on regeneration. Subsequently the diagram will be explained to indicate the operation when the reactors are reversed. Also complete description of the reactants, catalysts, temperature and flow rates and the like for preferred embodiment processes utilizing the present invention will be given subsequent to this description.

*When "A" is on reaction and "B" is on regeneration*

$C_4$–$C_6$ olefin or paraffin is pumped via line 1 through the coils 2 in furnace 3 whereby the hydrocarbon is preheated to the desired temperature. Valve 4 directs the flow of preheated hydrocarbon through lines 5, 6 and 7 into reactor "A." Concurrently steam superheated in coils 10 of furnace 11 is passed via line 12 and directed by valve 13 through line 14 and also through lines 6 and 7 into reactor "A" containing a fixed bed of the desired catalyst. The product is taken from the reactor "A" after passing valve 8 through line 9. In this modification valve 15 which could admit air is closed. The volume ratio of steam to hydrocarbon in the reactor may be from 18–30:1. At the same time steam from line 12 is led through valve 13 through line 16 into regenerator "B" containing deactivated catalyst, and air is admixed therewith via line 17 and valve 18. In this cycle there is no flow through lines 19 and 20. Steam and air are passed through regenerator "B" and are led via line 21 to burner 22. Fuel may be added via line 23 to effect the burning of all the air present in burner 22. Steam and other diluents comprising the combustion products and other gases, e.g. $CO_2$, $CO$, $H_2$ and $N_2$ are then led through valve 24 through line 25 to the main reactor "A" to supplement the steam and heat requirements of this reaction. During part of the regeneration of "B," no air is added via line 17 to line 16. This is during the purge periods immediately before and after the regeneration step. In order to preserve continuity of operation in the burner, and not to upset the overall heat balance in the unit, air may be added to line 32 via line 30 and valve 31 during these periods when air is not passed over the catalyst.

*When "B" is on reaction and "A" is on regeneration*

When valve 4 is adjusted to direct the preheated hydrocarbon flow into reactor "B" via lines 20 and 16. Steam is also fed to reactor "B" in the same manner as described previously through lines 12 and 16. Valve 18, however, is closed to exclude air from reactor "B" and crude product is recovered through valve 26 and line 27 for further processing. There is no flow in line 21 in this cycle. Regenerator "A" is fed steam via lines 12, 14, 6 and 7 and air via line 28 through valve 15 which is now open. The effluent from the regenerator "A" passes through valve 8, line 29 into burner 22 where fuel is injected via line 23 as previously indicated and the air-free effluent from the burner recycled via lines 19 and 16 to reactor "B."

It is to be understood that various modifications of the above specific drawings may be effected without diverging from the present invention. For example, the steam and hydrocarbon feed may each be individually injected into the tower "A" or joined by some other point than shown. The same is true with the fuel line 3 which may lead directly into the burner or may be placed at a point in line 21.

When switching a reactor from reaction to regeneration and vice versa, steam only is permitted to flow through the reactor. This will purge residual hydrocarbons out of the reactor before regeneration, and residual oxygen-containing gases after the regeneration step.

The following table represents specific and general conditions which may be employed in a process to produce butadiene from normal butenes according to the present invention.

TABLE I

*Conditions and reactants*

|  | General (Wt. Percent) | Specific (Wt. Percent) |
|---|---|---|
| Catalyst: | | |
| The preferred catalyst comprises— | | |
| Ni | 4.3–5.5 | 5 |
| Ca | 27.8–32.0 | 30 |
| $PO_4^\equiv$ | 49.0–60.5 | 57 |
| $Cr_2O_3$ | 1.0–8.0 | 6 |
| Graphite | 1.0–3.0 | 2 |
|  | General | Specific |
| Reaction Conditions: | | |
| Space velocity of $nC_4=$, v./v. hr.¹ | 75–200 | 120 |
| Space velocity of steam, v./v./hr.¹ | 1,400–4,000 | 2,300 |
| Reactor inlet temperature, °F | 1,000–1,3ᵣ0 | 1,175 |
| Temp. drop across reactor, °F | 50–100 | 70 |
| Reactor outlet pressure, p.s.i.a | 15–30 | 20 |
| n-butylene conversion, percent per pass | 30–60 | 40 |
| Selectivity to butadiene, percent | 75–95 | 85 |
| Regeneration and Burner Conditions: | | |
| Space velocity of steam, v./v./hr.¹ | 500–1,000 | 675 |
| Space velocity of air, v./v./hr.¹ | 75–150 | 105 |
| Regenerator inlet temp., °F | 1,000–1,300 | 1,175 |
| Temp. of effluent gases, °F | 1,000–1,300 | 1,175 |
| Outlet pressure, p.s.i.a | 25–50 | 30 |
| Fuel gas to burner (of typical composition shown below) | 8–12 | 9 |

¹ V./v./hr.—Volume of gas at S.T.P./volume catalyst/hr.

The same catalyst and all the above reaction and regeneration conditions are also used in the process for producing isoprene from isopentenes or isopentanes except that reaction temperatures in the upper part of the range given are preferred and a specific inlet temperature would thus be higher than that given, e.g. 1215° F. for isopentene and 1340° F. for the conversion of isopentane. Also, with respect to isopentane, conversions per pass rather than 30–60% are only 10–20%. However, since isopentane is comparatively inexpensive, the process is still attractive.

The same catalyst and all the Table I reaction and regeneration conditions including the specific conditions are also applicable to the conversion of 2,3-dimethyl butane and 2,3-dimethyl butenes to 2,3 dimethyl butadiene.

In order to burn all of the air or $O_2$ in the regenerator effluent gas, an excess of fuel will be required in order to insure complete elimination of any free oxygen under the normal fluctuations in air rate occurring in the normal operation of the unit. Any carbonaceous fuel, either gaseous, solid or liquid, may be used; however, for the sake of economy natural or refinery hydrocarbon gases are preferably employed. A typical natural gas comprises:

| | Mole percent |
|---|---|
| $C_1$ | 40 |
| $C_2$ | 40 |
| $C_3$ | 20 |

Any fuel gas not consumed by the burning will be converted by the water gas reaction to $H_2$, $CO_2$ and $CO$, which are not deleterious to the main dehydrogenation reaction when present in small quantities. Preferably, 20 to 50% excess fuel (with respect to the air) is employed.

The regeneration gas (effluent) and fuel may be brought together by simple mixing followed by or simultaneous with quenching. The combustion (and some quenching) may be carried out in a line burner or a burning drum as desired. A reforming or oxidation catalyst may also be provided if desired to insure complete oxygen removal.

In the event that the gaseous effluent from the burner is at a higher temperature than desired for the reaction, e.g. 1000° to 1300° F., the effluent may be quenched with 300° to 500° F. steam. This is not shown on the drawing, however, a typical effluent from the burner after quenching with steam would have the following composition:

| Component: | Mole percent |
|---|---|
| $H_2O$ | 91.6 |
| $N_2$ | 6.5 |
| CO | .01 |
| $CO_2$ | 1.2 |
| $H_2$ | .7 |

This gas can then be used as part of the diluent steam in the reaction, thereby saving considerable quantities of fresh steam which otherwise would be needed.

To further illustrate the advantages of this process over those of the prior art reference may be had to the following table:

TABLE II

*Steam requirements in prior art vs. present process*

| Stream and Operation | Prior Art | This Invention |
|---|---|---|
| Reaction: | | |
| Hydrocarbon feed, v./v./hr.[1] | 120 | 120 |
| Fresh Steam, v./v./hr | 2,300 | 1,100–1,600 |
| Reused Steam,[2] v./v./hr | | 700–1,200 |
| Regeneration: | | |
| Air, v./v./hr | 105 | 105 |
| Fresh Steam, v./v./hr | 700–1,500 | 700–1,500 |
| Total Fresh Steam Requirements, v./v./hr | 3,000–3,800 | 2,200–3,000 |

[1] Volume of gas at 0° C., 760 mm. per vol. of catalyst per hr.
[2] Steam from regenerator effluent after the burning step. The higher number includes quench steam from the regenerator gas burner.

In the past the amount of steam fed into the regenerator was closely watched since the effluent steam could only be discarded or used for less lucrative purposes such as in waste heat boilers. This resulted many times in the use of less steam than that required for a complete and efficient operation. In accordance with this process it is possible to economically use excess steam in the regeneration to effect a more complete and efficient regeneration of the catalyst.

Thus the two main advantages of this process are that it permits:

(1) A substantial reduction of fresh steam requirements over prior art processes.

(2) The use of more steam for efficient regeneration of catalyst.

What is claimed is:

1. An improved process for dehydrogenating $C_4$–$C_6$ hydrocarbons more highly saturated than diolefins to diolefins in a system comprising a reactor and a regenerator which comprises passing superheated steam and said hydrocarbons through said reactor containing a fixed dehydrogenation catalyst bed at elevated temperatures, recovering effluent comprising crude diolefins and concomitantly passing superheated steam and an excess of an oxygen containing gas into said regenerator containing deactivated dehydrogenation catalyst at elevated temperatures for a time sufficient to regenerate said catalyst, removing effluent from said regenerator comprising steam and air or oxygen containing gas, consuming all of the oxygen in said effluent by burning carbonaceous fuel in the presence thereof and employing the resultant essentially oxygen-free steam in said reactor as a part of the total steam requirements.

2. An improved process for dehydrogenating a particular $C_4$–$C_6$ hydrocarbon more highly saturated than a diolefin to its corresponding diolefin in a system comprising a reactor and a regenerator which comprises passing superheated steam and said particular hydrocarbon through said reactor containing a fixed dehydrogenation catalyst bed at elevated temperatures, recovering effluent comprising crude diolefin product and concomitantly passing superheated steam and an excess of an oxygen containing gas into said regenerator containing deactivated dehydrogenation catalyst at elevated temperatures for a time sufficient to regenerate said catalyst, removing effluent from said regenerator comprising steam and oxygen containing gas, consuming all of the oxygen in said effluent by burning carbonaceous fuel in the presence thereof and employing the resultant essentially oxygen-free steam in said reactor as a part of the total steam requirements.

3. An improved process for dehydrogenating butene to butadiene in a system comprising a reactor and a regenerator which comprises passing superheated steam and butene through said reactor containing a fixed dehydrogenation catalyst bed at elevated temperatures, recovering effluent comprising crude butadiene and concomitantly passing superheated steam and excess air into said regenerator containing deactivated dehydrogenation catalyst at elevated temperautres for a time sufficient to regenerate said catalyst, removing effluent from said regenerator comprising steam and air, consuming all of the oxygen in said effluent by burning a hydrocarbon gas in the presence thereof and employing the resultant essentially oxygen-free steam in said reactor as a part of the total steam requirements.

4. A butene dehydrogenation system employing a reactor and a regenerator, wherein superheated steam and butene are contacted in said reactor with a dehydrogenation catalyst for a time sufficient to convert a substantial portion of said butene to butadiene, and wherein deactivated catalyst previously used for dehydrogenating butene to butadiene is contacted with steam and excess air in a regenerator, the improvement which comprises burning a hydrocarbon gas in the presence of regenerator effluent comprising steam and air to consume substantially all of the oxygen therein, and passing essentially oxygen-free steam to said dehydrogenation reactor as a portion of the steam requirement thereto.

5. A method of dehydrogenating butene to butadiene in a continuous operation which comprises providing a pair of reactors containing a dehydrogenation catalyst, preheating the butene to be dehydrogenated to temperatures below active dehydrogenation temperatures, contacting the preheated butene with superheated steam at elevated temperatures, contacting the mixture of superheated steam and butene with said dehydrogenation catalyst in the first of said pair of reactors, simultaneously regenerating deactivated catalyst in the second of the said reactors by means of superheated steam and excess air in amounts sufficient to provide a regeneration gas containing large quanities of steam and air, withdrawing said regeneration gas from the catalyst undergoing regeneration in the last named reactor, burning a hydrocarbon gas in the presence of the effluent from said regeneration reactor which comprises steam and air until substantially all of the oxygen is consumed and recycling said essentially oxygen-free steam to the first named reactor as a portion of the steam requirement therefor.

6. A method in accordance with claim 5 wherein the catalyst is nickel-calcium phosphate.

7. A method in accordance with claim 6 wherein the regeneration reactor is purged with steam before and after regeneration.

8. A process of dehydrogenating butene in a system comprising a pair of reactors containing a nickel-calcium phosphate dehydrogenation catalyst wherein either reactor may act as the dehydrogenator while the other acts as the regenerator, which comprises passing butene with large amounts of steam through one of said reactors at a temperature between 1000° to 1300° F. for a period of time sufficient to convert 30 to 60% of the butenes to butadiene, recovering crude butadiene product while deactivating the catalyst within the reactor, concomitantly passing large amounts of regenerating gas comprising steam and excess air through the second reactor containing deactivated catalyst, previously used in the dehydrogenation of butene, at 1000° F. to 1300° F. thereby regenerating said catalyst, burning excess hydrocarbon gas in the presence of said regenerating gas from the second reactor whereby substantially all of the free oxygen is consumed and employing the remaining hot oxygen-free steam as a portion of the steam requirement for the dehydrogenation step.

9. An improved process for dehydrogenating isopentene to isoprene in a system comprising a reactor and a regenerator which comprises passing superheated steam and isopentene through said reactor containing a fixed dehydrogenation catalyst bed at elevated temperatures, recovering effluent comprising crude isoprene and concomitantly passing superheated steam and excess air into said regenerator containing deactivated dehydrogenation catalyst at elevated temperatures for a time sufficient to regenerate said catalyst, removing effluent from said regenerator comprising steam and air, consuming all of the oxygen in said effluent by burning a hydrocarbon gas in the presence thereof, and employing the resultant essentially oxygen-free steam in said reactor as a part of the total steam requirements.

10. An improved process for dehydrogenating isopentane to isoprene in a system comprising a reactor and a regenerator which comprises passing superheated steam and isopentane through said reactor containing a fixed dehydrogenation catalyst bed at elevated temperatures, recovering effluent comprising crude isoprene and concomitantly passing superheated steam and excess air into said regenerator containing deactivated dehydrogenation catalyst at elevated temperatures for a time sufficient to generate said catalyst, removing effluent from said regenerator comprising steam and air, consuming all of the oxygen in said effluent by burning a hydrocarbon gas in the presence thereof and employing the resultant essentially oxygen-free steam in said reactor as a part of the total steam requirements.

11. An improved process for dehydrogenating 2,3-dimethyl butene to 2,3-dimethyl butadiene in a system comprising a reactor and a regenerator which comprises passing superheated steam and 2,3-dimethyl butene through said reactor containing a fixed dehydrogenation catalyst bed at elevated temperatures, recovering effluent comprising crude 2,3-dimethyl butadiene and concomitantly passing superheated steam and excess air into said regenerator containing deactivated dehydrogenation catalyst at elevated temperatures for a time sufficient to regenerate said catalyst, removing effluent from said regenerator comprising steam and air, consuming all of the oxygen in said effluent by burning a hydrocarbon gas in the presence thereof and employing the resultant essentially oxygen-free steam in said reactor as a part of the total steam requirements.

12. An improved process for dehydrogenating 2,3-dimethyl butane to 2,3-dimethyl butadiene in a system comprising a reactor and a regenerator which comprises passing superheated steam and 2,3-dimethyl butane through said reactor containing a fixed dehydrogenation catalyst bed at elevated temperatures, recovering effluent comprising crude 2,3-dimethyl butadiene and concomitantly passing superheated steam and excess air into said regenerator containing deactivated dehydrogenation catalyst at elevated temperatures for a time sufficient to regenerate said catalyst, removing effluent from said regenerator comprising steam and air, consuming all of the oxygen in said effluent by burning a hydrocarbon gas in the presence thereof and employing the resultant essentially oxygen-free steam in said reactor as a part of the total steam requirements.

References Cited in the file of this patent

UNITED STATES PATENTS

| | | |
|---|---|---|
| 2,456,367 | Britton et al. | Dec. 14, 1948 |
| 2,542,813 | Heath | Feb. 20, 1951 |
| 2,641,619 | Noddings et al. | June 9, 1953 |